(12) United States Patent
Andrejko et al.

(10) Patent No.: US 9,390,374 B2
(45) Date of Patent: Jul. 12, 2016

(54) ADAPTIVE TESTING FOR ANSWERS IN A QUESTION AND ANSWER SYSTEM

(71) Applicant: International Business Machines Corporation, Armonk, NY (US)

(72) Inventors: Pamela D. Andrejko, Cary, NC (US); Andrew R. Freed, Cary, NC (US); Cynthia M. Murch, Pine Island, MN (US); Richard A. Salmon, Apex, NC (US); Charles S. Skinner, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/566,449

(22) Filed: Dec. 10, 2014

(65) Prior Publication Data
US 2016/0171371 A1    Jun. 16, 2016

(51) Int. Cl.
*G06N 5/02* (2006.01)
*G06F 17/30* (2006.01)
*G06F 17/28* (2006.01)

(52) U.S. Cl.
CPC ............ *G06N 5/022* (2013.01); *G06F 17/2881* (2013.01); *G06F 17/3097* (2013.01); *G06F 17/30867* (2013.01)

(58) Field of Classification Search
CPC ..................................................... G06N 5/022
See application file for complete search history.

(56) References Cited

U.S. PATENT DOCUMENTS

| | | | | |
|---|---|---|---|---|
| 4,872,122 A | * | 10/1989 | Altschuler | ............ G06F 19/345 356/432 |
| 8,463,673 B2 | | 6/2013 | Koll et al. | |
| 8,805,756 B2 | | 8/2014 | Boss et al. | |
| 2012/0100519 A1 | * | 4/2012 | Leinonen | ................. G09B 7/00 434/350 |
| 2013/0017523 A1 | | 1/2013 | Barborak et al. | |

* cited by examiner

*Primary Examiner* — Stanley K Hill
*Assistant Examiner* — Ola Olude Afolabi
(74) *Attorney, Agent, or Firm* — VanLeeuwen & VanLeeuwen; Diana R. Gerhardt (57) ABSTRACT

An approach is provided in which an information handling system analyzes correction information corresponding to an answer generated by a question answer system. The correction information includes a correction to the answer and captured variable information utilized by the question answer system to generate the answer. The information handling system selects input variables based upon the correction analysis and generates a test case that includes the selected input variables and the variable information. In turn, the information handling system tests the question answer system using the generated test case.

17 Claims, 8 Drawing Sheets

ADAPTIVE TESTING FOR ANSWERS IN A QUESTION AND ANSWER SYSTEM

BACKGROUND

Question answer systems may use natural language processing approaches to derive meaning from human or natural language input using algorithms based on statistical inference. A question answer system typically undergoes a training stage in which learning models automatically learn domain rules by analyzing a large corpora of documents and generating a knowledge base from which to access.

The question answer system also undergoes a testing stage in which the question answer system tests the learning models to ensure accuracy. In some cases, the question answer system is very complex and supports thousands of variables. Since testing each combination of variables in such a complex system requires an enormous amount of time, software testers typically employ a combinatorial test design (CTD) to generate test cases.

Combinatorial test design, also referred to as combinatorial testing, is a test design technique for verifying increasingly complex software systems. Combinatorial test design is based on the premise that a software bug depends on the interaction between a small number of features of a complex system under test. In combinatorial test design, a software test designer may manually model the test space using a set of attributes, their respective values, and restrictions on the value combinations.

BRIEF SUMMARY

According to one embodiment of the present disclosure, an approach is provided in which an information handling system analyzes correction information corresponding to an answer generated by a question answer system. The correction information includes a correction to the answer and captured variable information utilized by the question answer system to generate the answer. The information handling system selects input variables based upon the correction analysis and generates a test case that includes the selected input variables and the variable information. In turn, the information handling system tests the question answer system using the generated test case.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
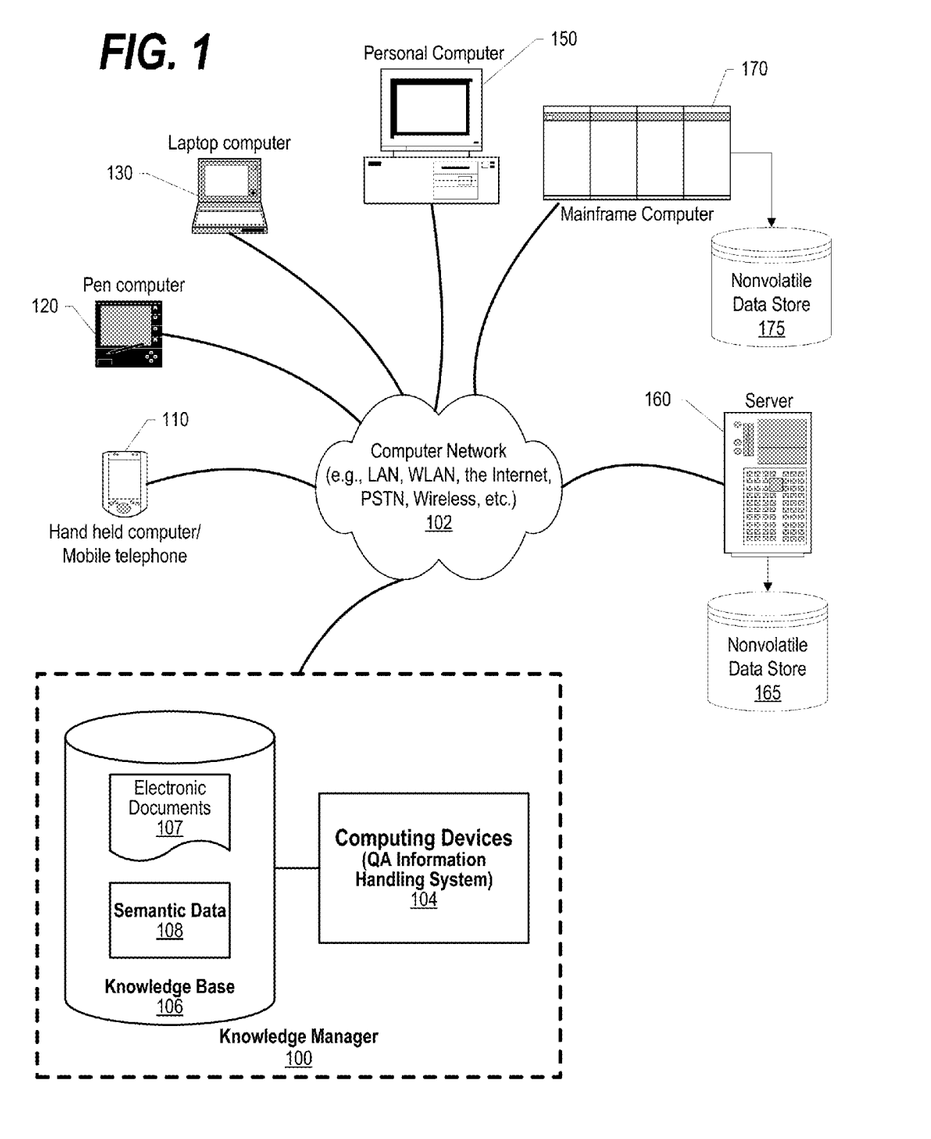
FIG. 1 depicts a schematic diagram of one illustrative embodiment of a knowledge manager system in a computer network.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 2:
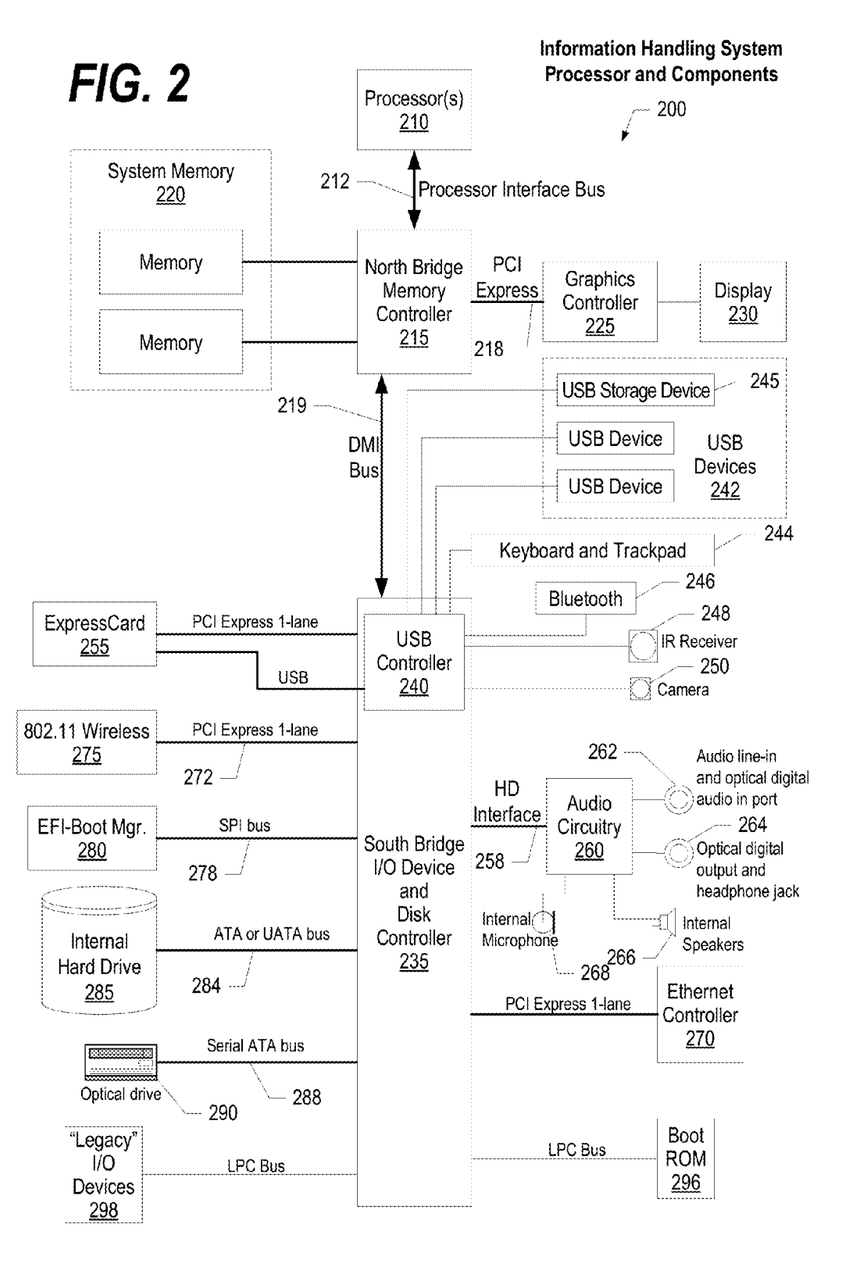
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. The information handling system, in one embodiment, analyzes incorrect answers generated by a computer system, such as a knowledge manager, and dynamically generates test cases to subsequently test the computer system. The information handling system receives the answer, a correction to the answer, and generates correction information that includes the answer, the correction, and evidence utilized by the computer system to generate the answer. The information handling system evaluates the correction and identifies influential variables that correspond to the correction. In turn, the test system regenerates a test plan and corresponding test cases to test the knowledge manager based upon the identified influential variables.

Figure 3:
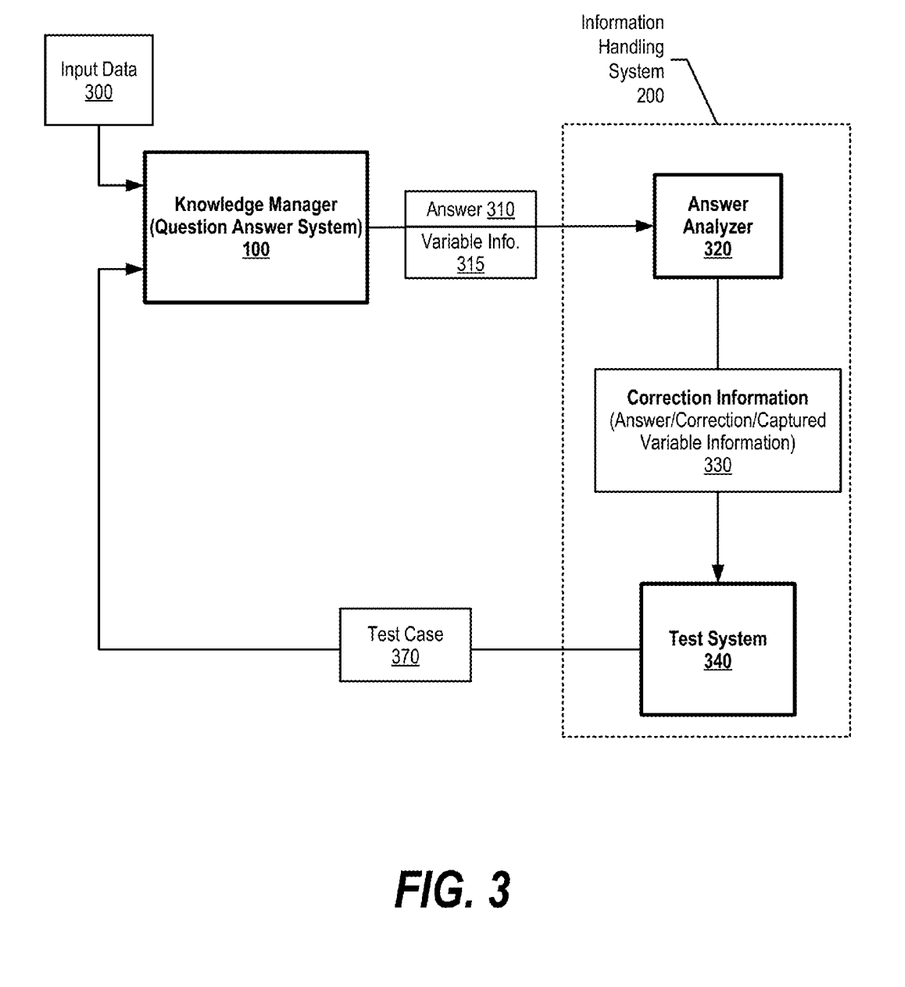
FIG. 3 is an exemplary diagram depicting an information handling system that receives correction information and generates tests cases that test a knowledge manager.

FIG. 3 is an exemplary diagram depicting an information handling system that receives correction information and generates tests cases that test a knowledge manager. Knowledge manager 100 receives input data 300 and generates answer 310 based upon learning models, algorithms, logic, etc. For example, input data 300 may be patient data and knowledge manager 100 provides answer 310 that may be a treatment of the patient's condition. Knowledge manager 100 also captures variable information 315, which includes supporting evidence (variable data) that knowledge manager 100 utilized to generate answer 310.

Information handling system 200 includes answer analyzer 320 and test system 340. In one embodiment, answer analyzer 320 and test system 340 reside on a single platform. In another embodiment, answer analyzer 320 and test system 340 reside on multiple platforms. Answer analyzer 320 receives answer 310 with variable information 315 and evaluates answer 310 for correctness. In one embodiment, answer analyzer 320 is a user interface system that displays answer 310 to a user (e.g., doctor) and receives feedback that includes a correction. In another embodiment, answer analyzer 320 is an automated system that automatically evaluates answer 310 and generates a correction to answer 310 when answer 310 is incorrect.

When answer 310 is incorrect, answer analyzer 320 generates correction information 330 that includes answer 310, the correction, and some or all of variable information 315. For example, if knowledge manager 100 utilized values corresponding to variables A, B, and C to generate answer 310, answer analyzer 320 captures the variable values corresponding to variables A, B, and C and inserts them into correction information 330. In one embodiment the variable information includes sensitive information, answer analyzer 320 may generate a "generalized" variable value based upon an actual variable value, or may not include certain parts of variable information 315 in correction information 330. For example, if the variable is a sensitive variable, answer analyzer 320 may generate a generalized variable value of low, medium, or high (see FIGS. 5, 7, and corresponding text for further details).

Test system 340 evaluates correction information 330 to determine changes needed to test knowledge manager 100 so knowledge manager 100 does not produce another incorrect answer in similar situations. In one embodiment, test system 340 identifies influential variables associated with the correction to generate, or regenerate, a new test plan. For example, if the correction stated that answer 310 is incorrect because of a patient's blood sugar level, test system 340 identifies influential variables associated with the patient's blood sugar level, which may be an actual blood sugar level or a generalized variable such as low, medium, or high (see FIGS. 7, 8 and corresponding text for further details). In turn, test system 340 generates test case 370 based on the new test plan, which tests knowledge manager 100 accordingly.

Figure 4:
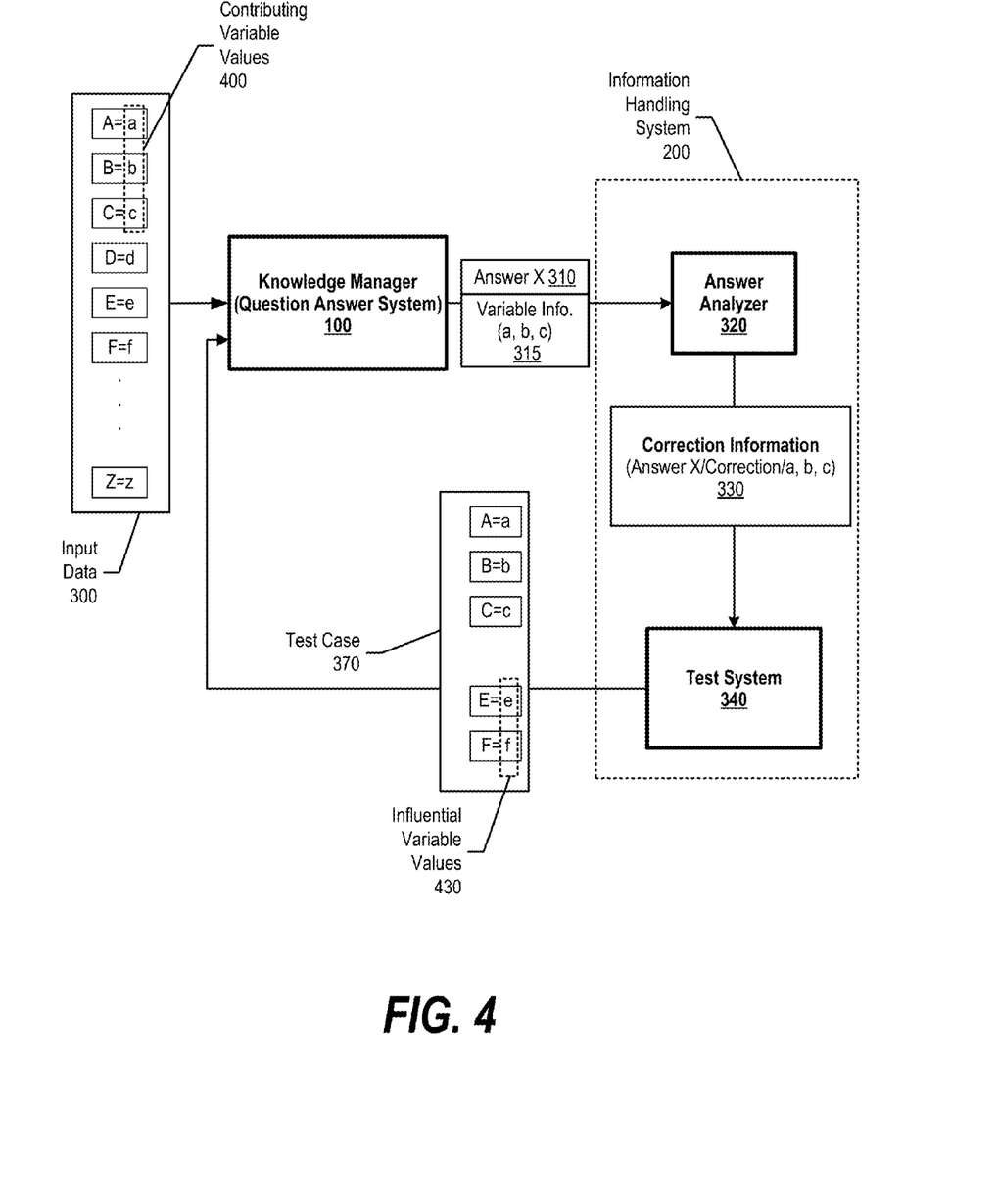
FIG. 4 is an exemplary diagram depicting an information handling system generating a test case that includes influential variable values corresponding to a correction to an answer.

FIG. 4 is an exemplary diagram depicting an information handling system generating a test case that includes influential variable values corresponding to a correction to an answer. Knowledge manager 100 receives input data 300 and generates answer X 310. Although input data 300 includes multiple variables, knowledge manager 100 utilizes contributing variable values 400 to generate answer X 310 and includes the values in variable information 315.

Answer analyzer 320 receives a correction to answer X 310 (e.g., from a user) and generates correction information 330 as discussed herein. Correction information 330 includes answer X 310, the received correction, and variable values a, b, and c captured from variable information 315.

Test system 340 evaluates correction information 330 and identifies influential variables "E" and "F" that correspond to the correction. As such, test system 340 regenerates a test plan to include the influential variables to test knowledge manager 100. Test system 340 generates test case 370 from the regenerated test plan that includes influential variable values 430 corresponding to the identified influential variables. In turn, test system 340 tests knowledge manager 100 using test case 370 to ensure that knowledge manager 100 produces correct answers.

Figure 5:
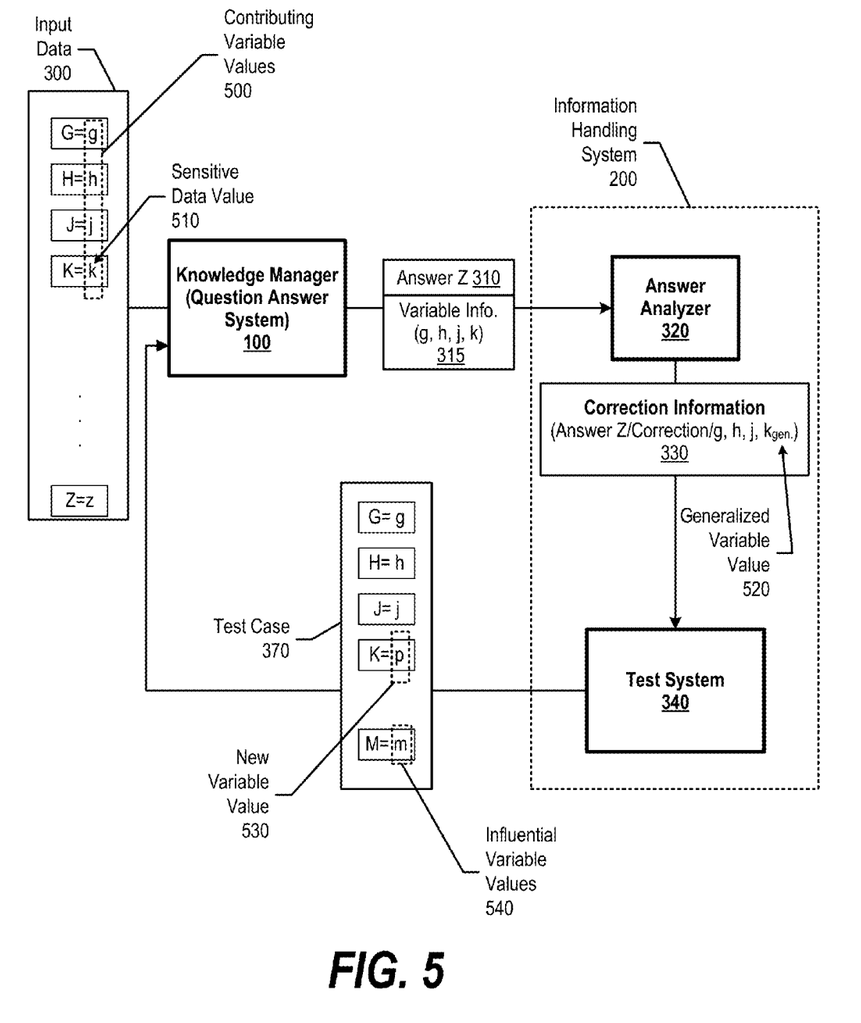
FIG. 5 is an exemplary diagram depicting an information handling system that replaces sensitive data with a generalized influential variable value to generate a test case.

FIG. 5 is an exemplary diagram depicting an information handling system that replaces sensitive data with a generalized influential variable value to generate a test case. Knowledge manager 100 receives input data 300 and uses contributing variables 500 to generate answer Z 310 and capture variable information 315.

One of contributing variable values 500, however, corresponds to sensitive information (variable K), which is sensitive data value 510. For example, variable K may correspond to a rare condition that affects one in a million people. Answer analyzer 320 analyzes variable information 315 and determines that variable value k corresponds to sensitive data. For example, answer analyzer 320 may access a table that includes a list of sensitive variables (see FIG. 7 and corresponding text for further details).

Answer analyzer 320 replaces the actual variable value (k) with a generalized value, such as "low," "medium," or "high." In turn, answer analyzer 320 generates correction information 330 that includes generalized variable value 520 in place of sensitive data value 510.

Test system 340 detects that correction information 330 includes generalized variable value 520. As such, test system 340 includes new variable value 530 in test case 370 based upon generalized variable value 520. In one embodiment, new variable value 530 may be a random value corresponding to generalized variable value 520. For example, if generalized variable value 520 is "low," new variable value 530 may be "2" (assuming value range from 1-10).

Test system 340 also includes influential variable value 540 corresponding to influential variables identified by test system 340 that corresponds to the correction to answer Z 310 as discussed herein.

Figure 6:
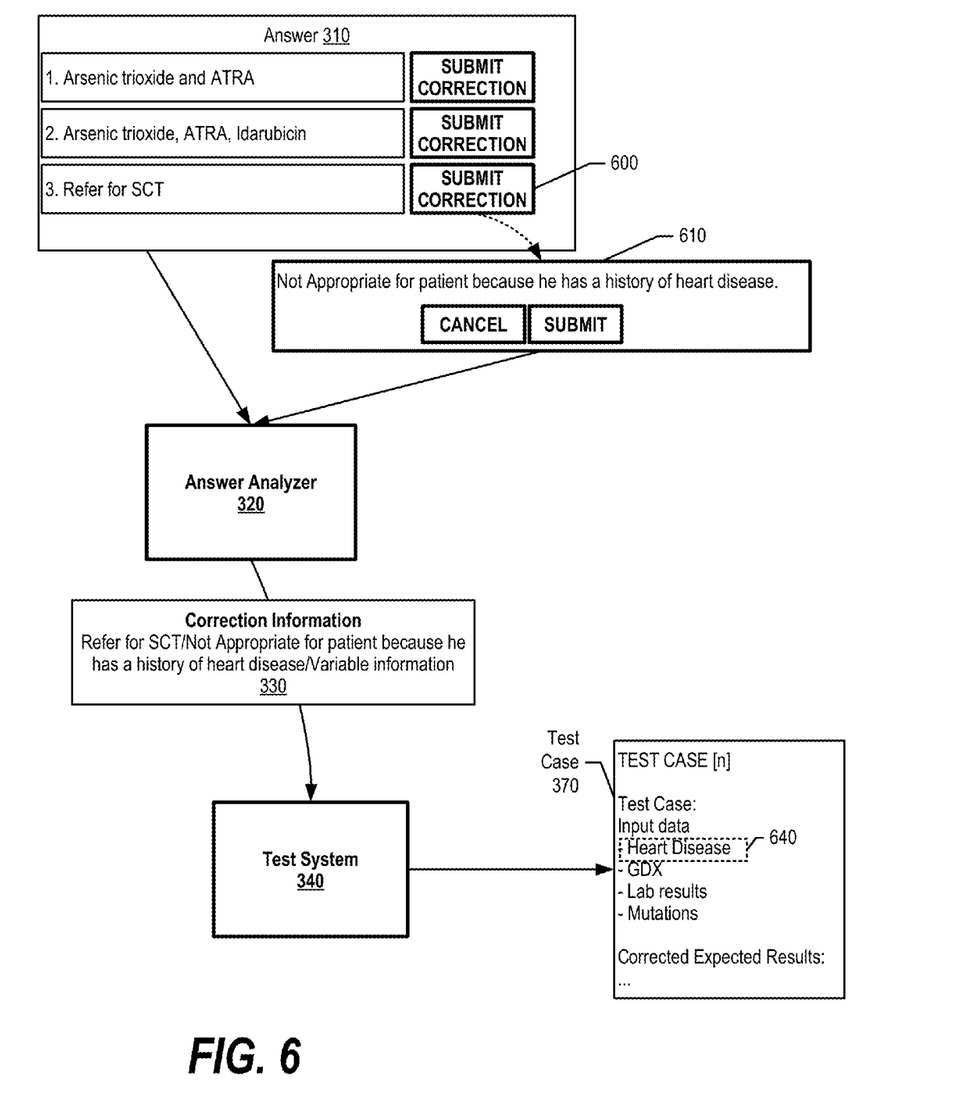
FIG. 6 is an exemplary diagram depicting an example of a user submitting a correction to an information handling system corresponding to a treatment provided by a knowledge manager.

FIG. 6 is an exemplary diagram depicting an example of a user submitting a correction to an information handling system corresponding to a treatment provided by a knowledge manager. Knowledge manager 100 provides answer 310 to answer analyzer 320, which answer analyzer 320 displays to a user such as a doctor. The doctor selects button 600 to enter correction 610 that indicates the corresponding treatment is incorrect. Answer analyzer 320, in turn, generates correction information 330 that includes the treatment (answer), the correction, and the variable information provided by knowledge manager 100 utilized to determine the treatment.

Test system 340 evaluates correction information 330 as discussed herein, and generates test case 370 accordingly. Test case 370 includes influential variable 640 corresponding to correction 610. In turn, test system 340 tests knowledge manager 100 using test case 370.

Figure 7:
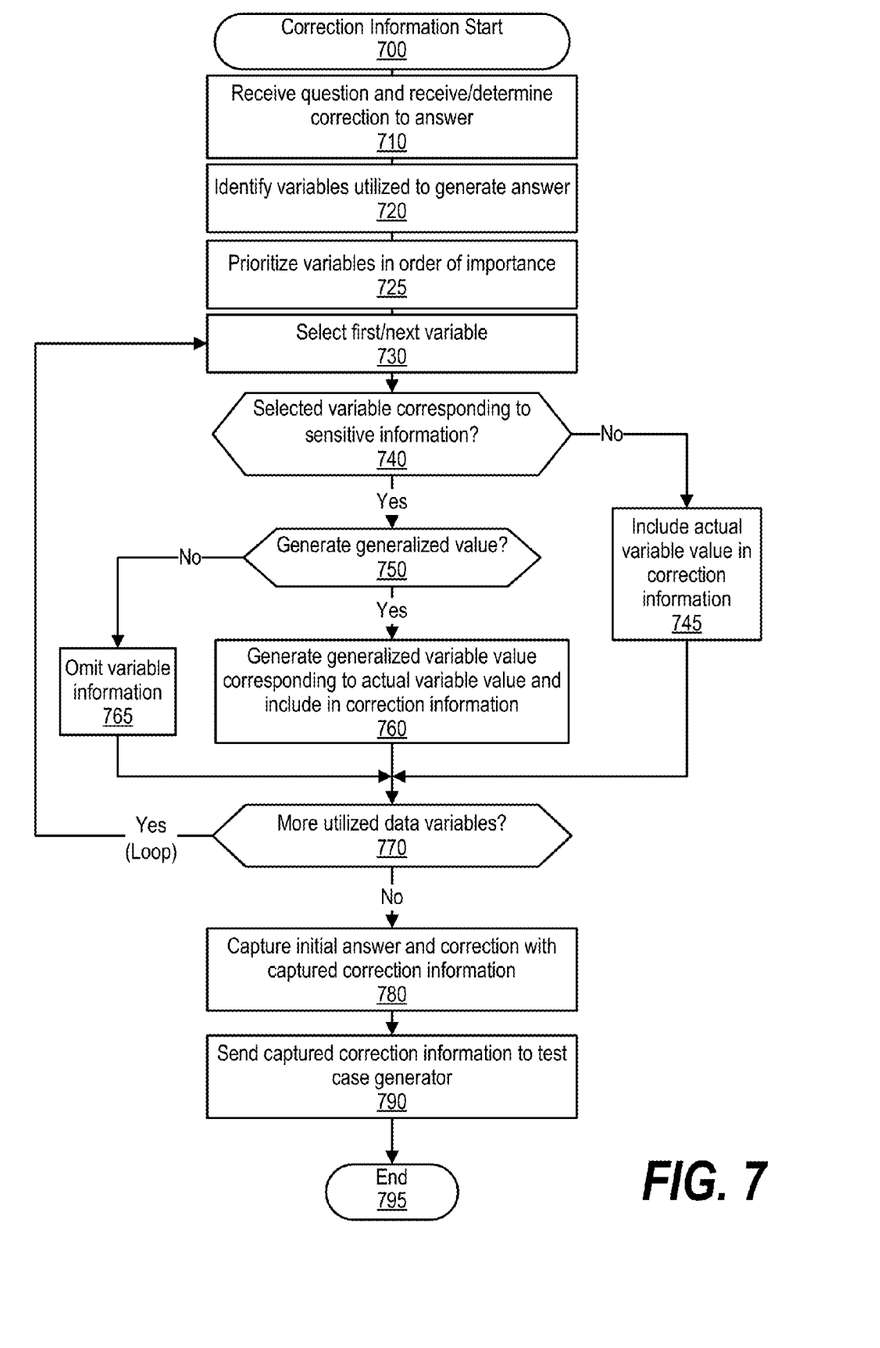
FIG. 7 is an exemplary flowchart depicting steps taken to generate correction information corresponding to an answer.

FIG. 7 is an exemplary flowchart depicting steps taken to generate correction information corresponding to an answer. Processing commences at 700, whereupon the process receives an question and receives/determines a correction to the answer at step 710. For example, a doctor may review a diagnosis and enter a correction to the diagnosis.

At step 720, the process captures variable information 315 utilized by the knowledge manager to generate the answer. At step 725, in one embodiment, the process prioritizes the identified variables in order of importance, such as by analyzing which variables the supporting evidence cites. In one embodiment, the process analyzes the knowledge manager's machine learning weights to determine which features have the highest significance. In another embodiment, the process prioritizes features cited in the actual feedback mechanism (e.g., doctor notes).

At step 730, the process selects the first variable and determines as to whether the selected variable corresponds to sensitive information (decision 740). For example, the process may access a sensitive variable table to determine if the selected variable is included in the table.

If the selected variable does not correspond to sensitive information, then decision 740 branches to the "no" branch, whereupon the process captures the actual variable name, the actual variable value, and includes them in correction information 330 at step 745.

On the other hand, if the selected variable corresponds to sensitive information, then decision 740 branches to the "yes" branch. The process determines as to whether to generate a generalized value or whether to omit reference to the variable based upon the sensitivity of the variable (decision 750).

If the process should generate a generalized value, then decision 750 branches to the 'yes' branch whereupon, at step 760, the process generates a generalized variable value corresponding to the actual data variable value and includes the generalized variable name and generalized variable value in correction information 330. In one embodiment, the process generates a variable "indicator" that indicates a variable value from a high-level perspective. For example, the generalized variable may be high, medium, low, yes, no, etc.

On the other hand, if the process should omit reference to the variable, then decision 750 branches to the 'no' branch whereupon the process omits the variable from correction information 330 at step 765.

The process determines as to whether more variables need to be analyzed (decision 770). If more variables need to be analyzed, then decision 770 branches to the 'yes' branch, which loops back to select the next variable. This looping continues until the process has analyzed each of the variables included in variable information 315, at which point decision 770 branches to the "No" branch.

At step 780, the process adds the answer and the correction to correction information 330. At step 790, the process sends correction information to the test system that includes the answer, the correction, and the captured variable information. FIG. 7 processing thereafter ends at 795.

Figure 8:
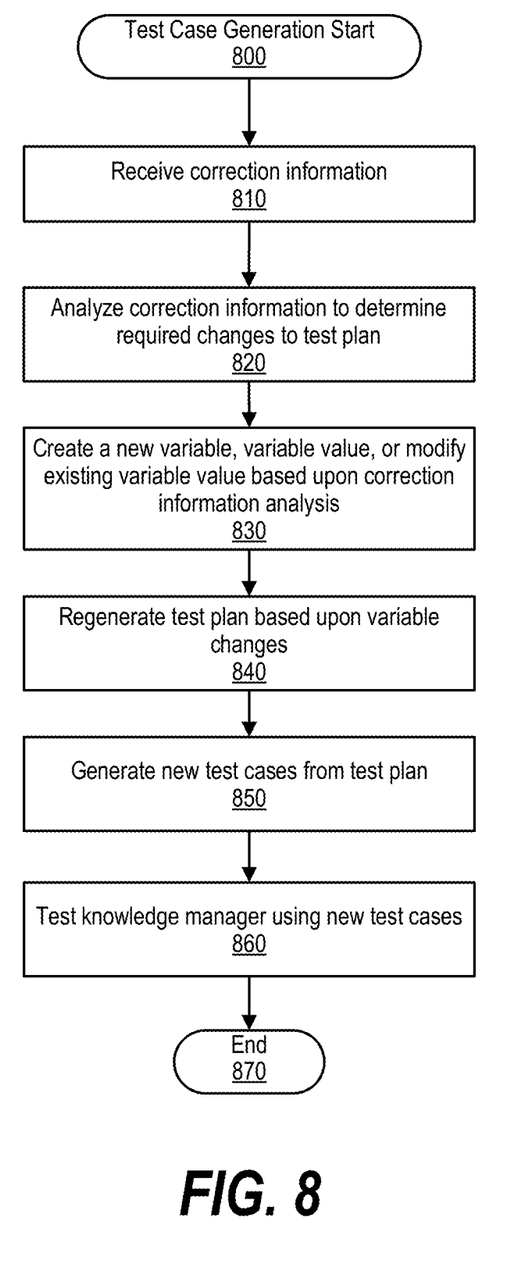
FIG. 8 is an exemplary flowchart showing steps to generate a test case based upon correction information.

FIG. 8 is an exemplary flowchart showing steps to generate a test case based upon correction information. Processing commences at 800, whereupon the process receives correction information 330 at step 810. At step 820, the process analyzes the correction information to determine required changes to the test plan.

In one embodiment, the process uses a combinatorial test design (CTD) tool to create a test plan from combinations of variables. In this embodiment, the CTD tool determines how many new test cases are required based upon the correction information. For example, if the correction information indicates that a test case should include a new variable, the CTD tool may attempt to insert coverage of the new variable into an existing set of test cases and then generate new test cases as needed in order to satisfy pair-wise coverage requirements. In another embodiment that requires a new variable value, the CTD tool generates new test cases to cover testing the new variable value with the other test attributes.

At step 830, the process creates a new variable, variable value, or modifies an existing variable value based upon the correction information analysis in step 820. At step 840, the process generates or regenerates a test plan based upon the variable changes and, at step 850, the process generates a new test case from the test plan and tests the knowledge manager using the new test cases at step 860. FIG. 8 processing thereafter ends at 870.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   analyzing, by the processor, correction information corresponding to an answer generated by a question answer system, wherein the correction information includes a correction to the answer and also includes a plurality of contributing variables that contributed to the generation of the answer;
   determining that at least one of the plurality of contributing variables is also a sensitive variable, wherein the sensitive variable corresponds to a condition of a patient;
   replacing, in response to the determination, a sensitive variable value corresponding to the sensitive variable with a generalized variable value;
   generating a test case based upon the generalized variable value; and
   testing the question answer system using the generated test case.

2. The method of claim 1 wherein the generalized variable value is based upon the sensitive variable value, and wherein the condition of the patient is a rare condition.

3. The method of claim 1 further comprising:
   selecting an influential variable in response to prioritizing the plurality of contributing variables;
   identifying an influential variable value corresponding to the selected influential variable; and
   including the influential variable value in the test case.

4. The method of claim 1 wherein the test case influences the question answer system to generate a different answer that corresponds to the correction.

5. The method of claim 1 further comprising:
   modifying a test plan based upon the sensitive variable, wherein the generated test case is based upon the modified test plan.

6. The method of claim 1 further comprising:
   receiving the correction from a user in response to providing the answer to the user; and
   capturing the plurality of contributing variables in response to receiving the correction from the user.

7. An information handling system comprising:
   one or more processors;
   a memory coupled to at least one of the processors; and
   a set of computer program instructions stored in the memory and executed by at least one of the processors in order to perform actions of:
      analyzing, by the processor, correction information corresponding to an answer generated by a question answer system, wherein the correction information includes a correction to the answer and also includes a plurality of contributing variables that contributed to the generation of the answer;
      determining that at least one of the plurality of contributing variables is also a sensitive variable, wherein the sensitive variable corresponds to a condition of a patient;
      replacing, in response to the determination, a sensitive variable value corresponding to the sensitive variable with a generalized variable value;
      generating a test case based upon the generalized variable value; and
      testing the question answer system using the generated test case.

8. The information handling system of claim 7 wherein the generalized variable value is based upon the sensitive variable value, and wherein the condition of the patient is a rare condition.

9. The information handling system of claim 7 wherein the one or more processors perform additional actions comprising:
   selecting an influential variable in response to prioritizing the plurality of contributing variables;
   identifying an influential variable value corresponding to the selected influential variable; and
   including the influential variable value in the test case.

10. The information handling system of claim 7 wherein the test case influences the question answer system to generate a different answer that corresponds to the correction.

11. The information handling system of claim 7 wherein the one or more processors perform additional actions comprising:
   modifying a test plan based upon the sensitive variable, wherein the generated test case is based upon the modified test plan.

12. The information handling system of claim 7 wherein the one or more processors perform additional actions comprising:
   receiving the correction from a user in response to providing the answer to the user; and
   capturing the plurality of contributing variables in response to receiving the correction from the user.

13. A computer program product stored in a non-transitory computer readable storage medium, comprising computer program code that, when executed by an information handling system, causes the information handling system to perform actions comprising:
   analyzing, by the processor, correction information corresponding to an answer generated by a question answer system, wherein the correction information includes a correction to the answer and also includes a plurality of contributing variables that contributed to the generation of the answer;
   determining that at least one of the plurality of contributing variables is also a sensitive variable, wherein the sensitive variable corresponds to a condition of a patient;
   replacing, in response to the determination, a sensitive variable value corresponding to the sensitive variable with a generalized variable value;

generating a test case based upon the generalized variable value; and testing the question answer system using the generated test case.

14. The computer program product of claim 13 wherein the generalized variable value is based upon the sensitive variable value, and wherein the condition of the patient is a rare condition.

15. The information handling system of claim 13 wherein the information handling system performs additional actions comprising:
    selecting an influential variable in response to prioritizing the plurality of contributing variables;
    identifying an influential variable value corresponding to the selected influential variable; and
    including the influential variable value in the test case.

16. The computer program product of claim 13 wherein the test case influences the question answer system to generate a different answer that corresponds to the correction.

17. The computer program product of claim 13 wherein the information handling system performs additional actions comprising:
    modifying a test plan based upon the sensitive variable, wherein the generated test case is based upon the modified test plan.

* * * * *